United States Patent
Srinivasan et al.

(10) Patent No.: US 7,620,870 B2
(45) Date of Patent: Nov. 17, 2009

(54) DATA COMPRESSION METHOD AND SYSTEM

(75) Inventors: Udayakumar Srinivasan, Hayward, CA (US); Syam Sundar V. Appala, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 713 days.

(21) Appl. No.: 11/287,093

(22) Filed: Nov. 22, 2005

(65) Prior Publication Data

US 2007/0115964 A1    May 24, 2007

(51) Int. Cl.
*H03M 7/30* (2006.01)
*H04L 1/12* (2006.01)

(52) U.S. Cl. ...................... 714/748; 709/247
(58) Field of Classification Search ................. 714/748, 714/749; 709/247; 370/477
See application file for complete search history.

(56) References Cited

U.S. PATENT DOCUMENTS

| | | | |
|---|---|---|---|
| 6,388,584 B1* | 5/2002 | Dorward et al. ............... 341/51 |
| 6,608,841 B1* | 8/2003 | Koodli ........................ 370/474 |
| 6,643,815 B1* | 11/2003 | Davis et al. .................. 714/758 |
| 6,882,637 B1* | 4/2005 | Le et al. ...................... 370/349 |
| 6,889,261 B2* | 5/2005 | Hata et al. ................... 709/247 |
| 7,277,693 B2* | 10/2007 | Chen et al. ............... 455/414.1 |
| 7,290,063 B2* | 10/2007 | Kalliokulju et al. ......... 709/247 |
| 7,430,617 B2* | 9/2008 | Walsh et al. ................ 709/247 |
| 7,486,700 B2* | 2/2009 | Miyazaki et al. ............ 370/477 |
| 7,539,130 B2* | 5/2009 | Le et al. ...................... 370/216 |
| 7,543,079 B1* | 6/2009 | Ho .............................. 709/247 |
| 2005/0086383 A1* | 4/2005 | Le .............................. 709/247 |

* cited by examiner

*Primary Examiner*—Stephen M Baker
(74) *Attorney, Agent, or Firm*—Stolowitz Ford Cowger LLP (57) ABSTRACT

A data compression method and system is disclosed. In one embodiment, the data compression method includes receiving a data packet. Also, the method includes compressing the data packet using a confirmed compression history, wherein the confirmed compression history includes previously acknowledged data packets. Further, the method includes sending a compressed data packet to a downstream device. Moreover, the method includes detecting a delivery acknowledgement associated with the compressed data packet. Continuing, the method includes updating the confirmed compression history by incorporating the data packet information into the confirmed compression history based upon receipt of the delivery acknowledgement.

18 Claims, 9 Drawing Sheets

DATA COMPRESSION METHOD AND SYSTEM

FIELD OF THE INVENTION

Embodiments of the present invention relate to a data compression method and system.

BACKGROUND OF THE INVENTION

A number of advantageous results can be achieved with modern electronic components arranged in a variety of different system and network configurations. Operations directed at achieving the advantageous results often involve a significant amount of data communications between the electronic components. However, communications bandwidth in conventional electronic component systems and networks is usually limited by the processing capabilities of the electronic systems, local area network (LAN) characteristics and wide area network (WAN) characteristics. For example, WAN bandwidth can be relatively expensive and unpredictable, which can lead to slower response times. Some traditional attempts at addressing bandwidth limitation concerns involve compression of information included in a communication packet. However, traditional attempts at conserving bandwidth by compressing data can include complex compression history dependencies and maintaining synchronization between the compression and decompression points can be problematic.

Generally, compression of information included in communication packets works by having a compression engine at one end of the data link and a decompression engine at the other end. Data compression algorithms typically search for data string patterns within an input data packet stream, perform a mathematical pattern analysis, and replace portions of the data strings with encoded tokens of shorter length in a compressed output data packet stream. For example, data compression algorithms often search for a string in the input data that matches a previous data string and create an encoded token that consists of a pointer to the previous data string. The encoded tokens are utilized to replace the redundant strings in the input data packet stream. Stateless data compression and stateful data compression are two primary types of traditional data compression algorithms that utilized encoded token replacement.

In stateless data compression, the compression history is unique to each data packet and not maintained across different data packets. Stateless data compression is a relatively reliable compression technique because compression history synchronicity is maintained within each packet between compression and decompression points. However, because the compression history is reset after every packet, a higher compression ratio is often more difficult to achieve. For example, maintaining one generic compression history for all received packets without knowing the type of packet and compressing them can lead to poor compression ratios, including situations where compression inflates encrypted packets.

Stateful data compression is when compression history information is maintained across packets. By maintaining compression history across data packets, more data for utilization in creating a compression history is available. For example, GZIP compression history accumulated across multiple packets provides significantly more opportunity for "filling" traditional 32 Kbyte buffers and achieving a superior compression ratio compared to GZIP compression of each 1.5 K byte packet individually. However, both the compression and the decompression history need to be synchronized across packets for stateful data compression communication to operate properly.

In order for data packets to decompress correctly, the data packets have to be decompressed in the same order they were compressed. Consequently, if data packets that are incorporated into the compression history on the compression side are not delivered to the decompression side, the decompression engine decompresses the data packets incorrectly. For example, data packets 1, 2, and 3 can enter a compression engine in that order, and the compression engine can use the data in data packets 1 and 2 to compress data packet 3. If data packet 3 is decompressed before data packet 2, an incorrect decompression for data packet 3 can occur. Furthermore, subsequent data packets after data packet 3 that are also dependent on the dropped packet for decompression can result in a series of incorrectly decompressed packets.

Maintaining synchronous compression and decompression histories across data packets when an inter-data packet dependency is created can be difficult. A number of different situations can result in an upstream device compressing data and updating the upstream device's compression history without a corresponding update in the decompression history. In a situation in which the compressed data never reaches the downstream device, such as a packet is dropped or reordered during communication, the downstream device's decompression history becomes out of sync with the upstream device's compression history. In some situations, a deliberate decision not to send the compressed data is made after the data is compressed. When compressing data actually inflates the number of bits in a packet, a decision can be made to send the raw data instead of the compressed data, but since the data was compressed initially corresponding information is entered in the compression history. However, the downstream device does not make a corresponding update to the decompression history because the downstream device receives the sent raw data and not compressed data.

The sequential nature of communications tends to exacerbate the impact of compression history synchronization problems. Since the communications packets are usually a part of a communication packet stream, the downstream device can generate a series of incorrectly decompressed packets. Traditional attempts at addressing compression history synchronization problems typically consume considerable bandwidth. For example, some conventional approaches directed at synchronization resolution involve dedicated communications or handshaking that tie up or "consume" considerable bandwidth. Tying up limited bandwidth usually reduces perceived communication network performance and can adversely impact implementation of applications over a network.

DETAILED DESCRIPTION OF THE DRAWINGS

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

The present invention facilitates efficient and accurate data compression. Compression data related information is not entered in a compression history until a corresponding acknowledgement has been received. In one embodiment, present invention systems and methods utilize transmission control protocol (TCP) information to transparently facilitate compression history maintenance. In one exemplary implementation, TCP acknowledgements that are part of a client-server TCP protocol interaction are snooped by intermediate network components to determine if a compressed packet has been delivered and corresponding information should be included in a compression history. By snooping TCP acknowledgements between intermediate network devices transparently, express acknowledgements from a downstream device are not needed. It is appreciated that the present invention can be implemented in variety of implementations, and while the following explanations may focus on transmission control protocol (TCP) applications, it is appreciated that the present invention can be adapted to snoop other similar acknowledgement protocols for utilization in maintaining compression histories. It is also appreciated that embodiments of the present invention can be readily implemented with compression context information in communication packets to facilitate synchronization in a decompression history.

Figure 1:
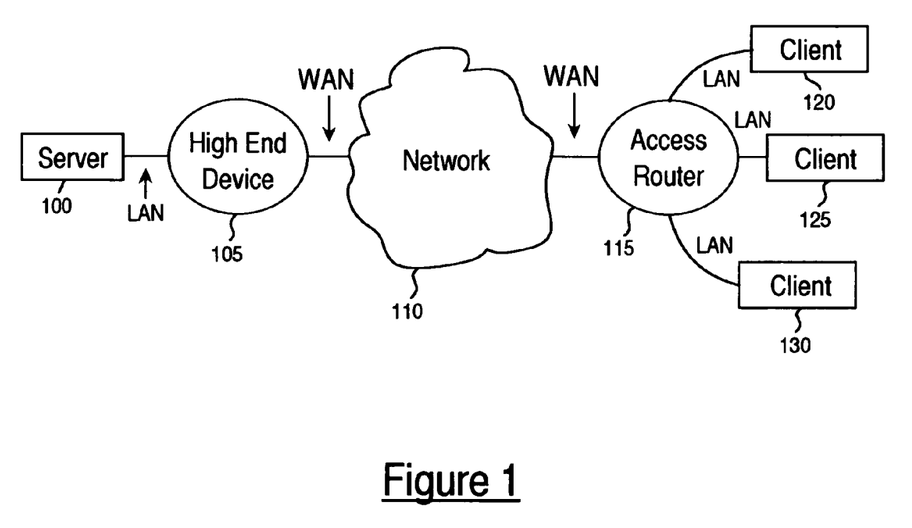
FIG. 1 illustrates a block diagram of an exemplary network environment upon which embodiments of the present invention can be implemented in accordance with an embodiment of the present invention.

FIG. 1 shows a block diagram of an exemplary network environment 100 upon which embodiments of the present invention can be implemented. Within network environment 100, a server 101, high-end device 105, clients 120, 125, and 130, and access router 115 are communicatively coupled. In one exemplary implementation, a server 101 high-end device 105 share a first LAN, access router 115 and clients 120, 125, and 130 share a second LAN, and high-end device and access router 115, and high-end device 105 and access router 115 share a WAN. It is appreciated that the components of network environment 100 can be communicatively coupled via a variety of wired and/or wireless communications technologies. In one exemplary enterprise network implementation, the access router 115 and the high-end device 105 are connected across the WAN (e.g., using a sub-T1 line). Intermediate network devices (e.g., access router 115 and high-end device 105) situated between the client and the server can perform data compression and decompression in accordance confirmed data histories in which synchronization is maintained by transparent monitoring of TCP acknowledgements. While the present description focuses on compression and decompression operations in access router 115 and high-end device 105, it is appreciated that the present invention is readily adaptable to data compression and decompression operations implemented at other points in network environment 100.

The network 110 of networking environment 100 can be implemented in a wide variety of ways. For example, network 110 can include various local area networks (LAN), metropolitan area networks (MAN), wide area network (WAN)s, and/or the Internet. It is also appreciated that components of networking environment 100 can be communicatively coupled via wired and/or wireless communication technologies. In addition, within FIG. 1, it is understood that networking environment 100 can be implemented to include greater or fewer number of clients, routers, high end-devices, and servers than the number shown. It is also appreciated the present invention is not necessarily limited to devices or the configuration of networking environment 100.

Figure 2:
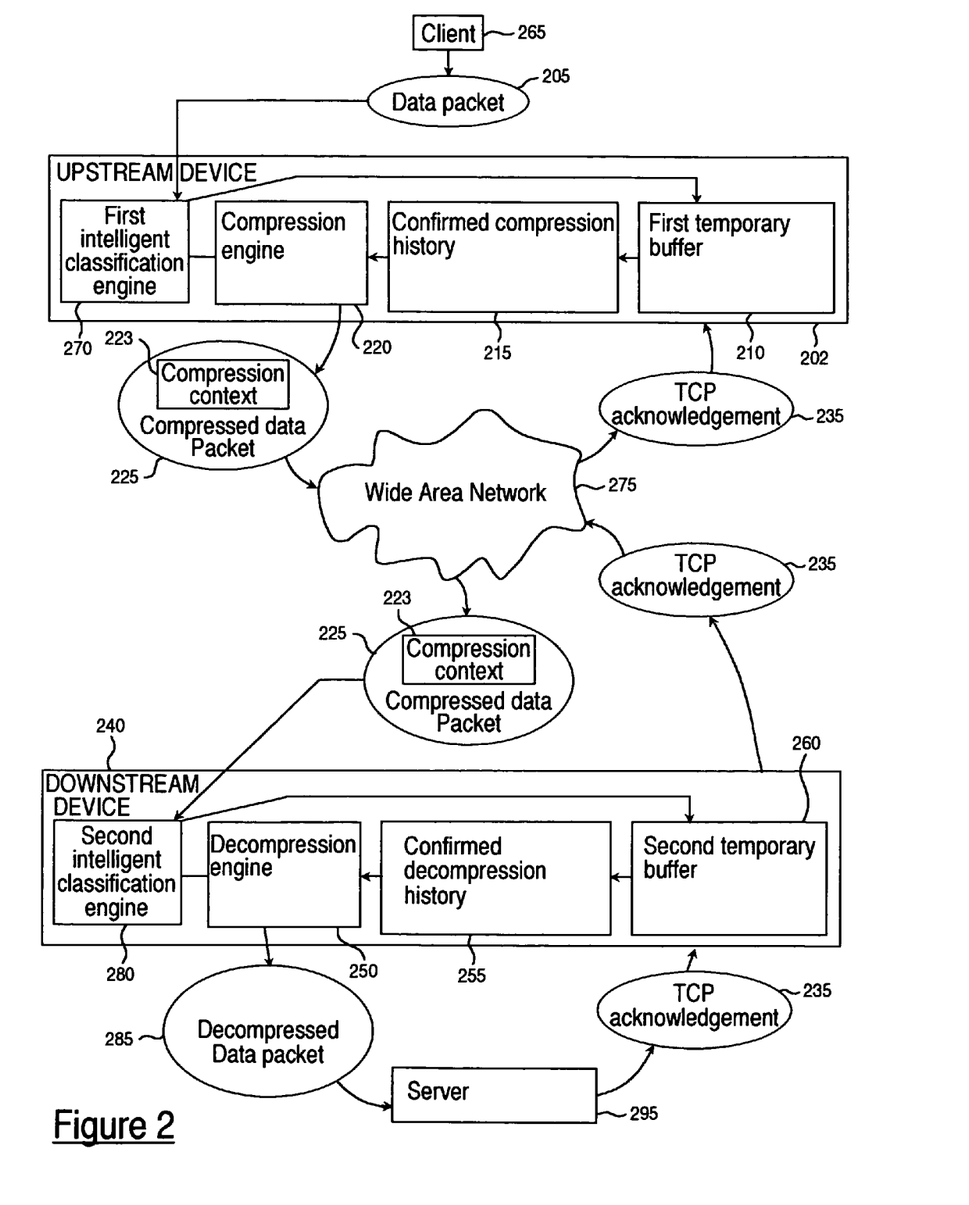
FIG. 2 illustrates a block diagram of an exemplary data compression scheme, in accordance with an embodiment of the present invention.

FIG. 2 shows a block diagram of an exemplary data compression scheme 200 in accordance with one embodiment of the present invention. In one exemplary implementation, the components of data compression scheme 200 are similar to the components of networking environment 100. The data compression scheme 200 includes a client 265, an upstream device 202, a wide area network 275, a downstream device 240, and a server 295. Upstream device 202 includes a compression engine 220, a confirmed compression history 215, a first intelligent classification engine 270, and a first temporary buffer 210. The downstream device 240 includes a decompression engine 250, a second temporary buffer 260, a second intelligent classification engine 280, and a confirmed decompression history 255. The client 265 is communicatively coupled to upstream device 202, which in turn is communicatively coupled to the downstream device 240 via the wide area network 275. Downstream device 240 is communicatively coupled to server 295. Within the upstream device 202, the confirmed compression history 215 is communicatively coupled to both the compression engine 220 and the first temporary buffer 210. Also, first intelligent classification engine 270 is communicatively coupled to compression engine 220. Similarly, within the downstream device 240, the decompression engine 250 is communicatively coupled with both the confirmed decompression history 255 and the second temporary buffer 260. Also, the second intelligent classification engine 280 is coupled with decompression engine 250.

The components of data compression scheme 200 cooperatively operate to efficiently perform data compression. In one exemplary implementation, the upstream device 202 receives a data packet 205 from client 265, compresses the data packet in accordance with confirmed data history 215 (which is transparently maintained based upon TCP acknowledgements), and forwards the compressed data packet 225 to network 275. Additional description of upstream device 202 operations are presented in flowing paragraphs. Network 275 communicates the compressed data packet 225 to downstream device 240. Network 275 also communicates the TCP acknowledgement 235 to upstream device 202. Downstream device 240 decompresses the compressed data packet 225 in accordance with confirmed decompression history 255 and forwards the decompressed packet 285 to server 295. Additional operations of downstream device 240 are presented in following paragraphs. Server 295 forwards the TCP acknowledgement 235 to downstream device 240.

Within upstream device 202, the data packet 205 is sent to first intelligent classification engine 270. First intelligent classification engine 270 determines if data packet 205 includes information that is to be compressed (additional operations of first intelligent classification engine 270 associated with differentiating data flows are described in following paragraphs). If data packet 205 includes information to be compressed, data packet 205 is forwarded to the compression engine 220 which compresses the data packet 205. The data packet 205 is also sent to the first temporary buffer 210, which temporarily stores the data until receipt of a TCP acknowledgement 235 associated with data packet 205. After receipt of the TCP acknowledgement 235 associated with data packet 205, the data is forwarded from first temporary buffer 210 to confirmed compression history 215. It is appreciated that data compression scheme 200 can be implemented to include a greater number of confirmed compression histories than the one confirmed compression history (e.g. 215) shown.

In one embodiment, a compression context 223 is included in the low over head compression header of compressed data packet 225 and can be sent to the downstream device 240. The compression context 223 includes information associating the contents of confirmed compression history 215 and the compressed data packet 225. For example, compression context 223 can be a sequence number indication corresponding to a previously sent data packet that corresponds to update information included in confirmed compression history and utilized in the compression of current compressed data packet 225.

Within downstream device 240, received compressed data packet 225 is sent to second intelligent classification engine 280. Second intelligent classification engine 280 determines if data packet 205 includes information that is compressed (additional operations of second intelligent classification engine 270 associated with differentiating data flows are described in following paragraphs). If data packet 205 includes information to be decompressed, data packet 205 is forwarded to the decompression engine 250 which decompresses the data packet 205. The decompressed information is forwarded to server 295 and is also sent to the second temporary buffer 260, which temporarily stores the information until receipt of an indication the information has been incorporated in confirmed compression history 215.

In one exemplary implementation, compression context information 223 is included in compressed data packet 225. The compression context information 223 indicates information utilized in confirmed compression history 215 when the compressed data packet 225 was compressed. For example, the compression context information 223 can include the sequence number of a previous packet that had information which was included in confirmed compression history 215 and utilized to compress information in the current compressed data packet 225. When a compression context indication is received, the corresponding information is forwarded from second temporary buffer 260 to confirmed decompression history 255. It is appreciated that data compression scheme 200 can be implemented to include a greater number of confirmed decompression histories than the one confirmed decompression history (e.g. 255) shown.

In one embodiment, first intelligent classification engine 270 distinguishes data packets from different data flows based on application types and creates different confirmed compression histories for the data packets from different applications. It is appreciated that data compression scheme 200 can be implemented to include multiple confirmed compression histories (not shown) than the one confirmed compression history (e.g. 215) shown. In one exemplary implementation, a first compression history is maintained for data packets associated with a first application (e.g., word processing application) and a second compression history is maintained for data packets associated with a second application (e.g., a voice real-time transport protocol stream).

In addition, it is appreciated the temporary buffer can be implemented in a variety of ways. For example, the first temporary buffer 210 can be a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and/or any other storage medium.

FIG. 3A through 3D illustrate an exemplary implementation of the present invention in operation. The communication system 300 includes client 365, an upstream device 302, a wide area network 375, a downstream device 340, and a server 395. The components of communication system 300 are similar to those in network environment 100 and data compression scheme 200. Upstream device 302 includes a compression engine 320, a confirmed compression history 315, a first intelligent classification engine 370, and a first temporary buffer 310. The downstream device 340 includes a decompression engine 350, a second temporary buffer 360, a second intelligent classification engine 380, and a decompression history 355.

Figure 3A:
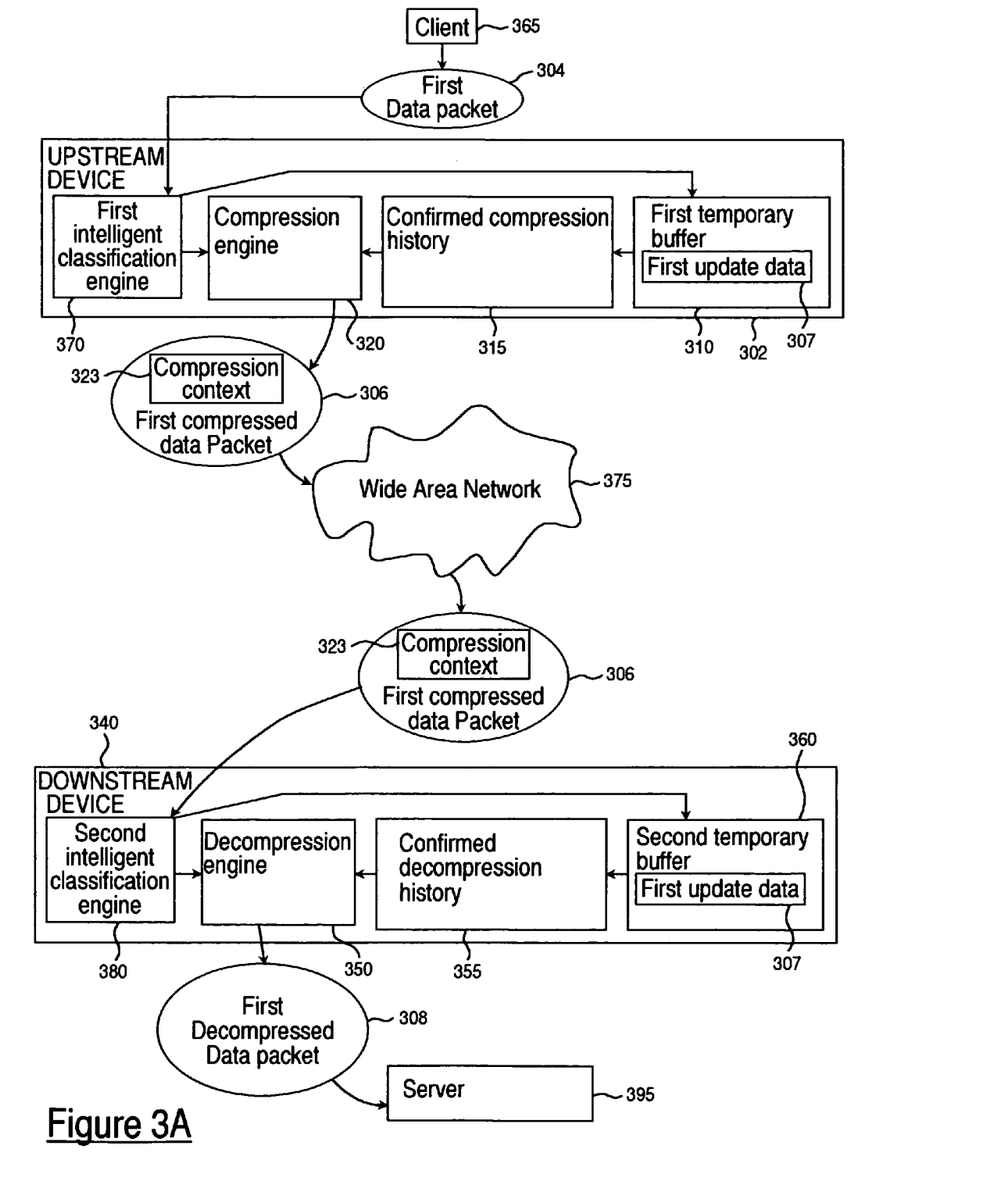
FIG. 3 shows a compression and decompression system in operation.

As shown in FIG. 3A, client 365 sends first data packet 304 to upstream device 302 and the data packet is received by first intelligent classification engine 370. First intelligent classification engine 370 determines if first data packet 304 is to be compressed. First intelligent classification engine 370 can also distinguish data packets from different data flows (e.g., based on application types) and create different confirmed compression histories for the data packets from different data flows. First intelligent classification engine forwards first data packet 304 to compression engine 320 for compressing and corresponding first update data 307 to first temporary buffer for temporary storage. Compression engine 320 compresses first data packet 304 into first compressed data packet 306 and sends it to downstream device 340 via wide area network 375. It is appreciated that the TCP header information from data packet 312 is maintained and starting a "new" TCP session is not required. It is also appreciated that present invention can be readily utilized in implementations in which the whole packet is compressed or implementations in which just the payload is compressed. In one embodiment, compression context 323 is included in first compression data packet 306. In one exemplary implementation, compression context 323 indicates confirmed compression history 315 was empty when compression operations associated with data in first compressed data packet 306.

First compressed data packet 306 is received by downstream device 340. In one embodiment, second intelligent classification engine 380 determines if first compressed data packet 306 is compressed. Second intelligent classification engine 380 can also distinguish compressed data packets from different flows based on application types and creates different confirmed decompression histories corresponding to the different confirmed compression histories created for the compressed data packets from different applications. Decompression engine 350 examines compression context 323 to determine that confirmed compression history 315 was empty when first compressed data packet 306 was compressed. Decompression engine 350 decompresses first compressed data packet 306 and sends first decompressed data packet 308 to server 395. Related first update data 307 is stored in second temporary buffer 360.

Figure 3B:
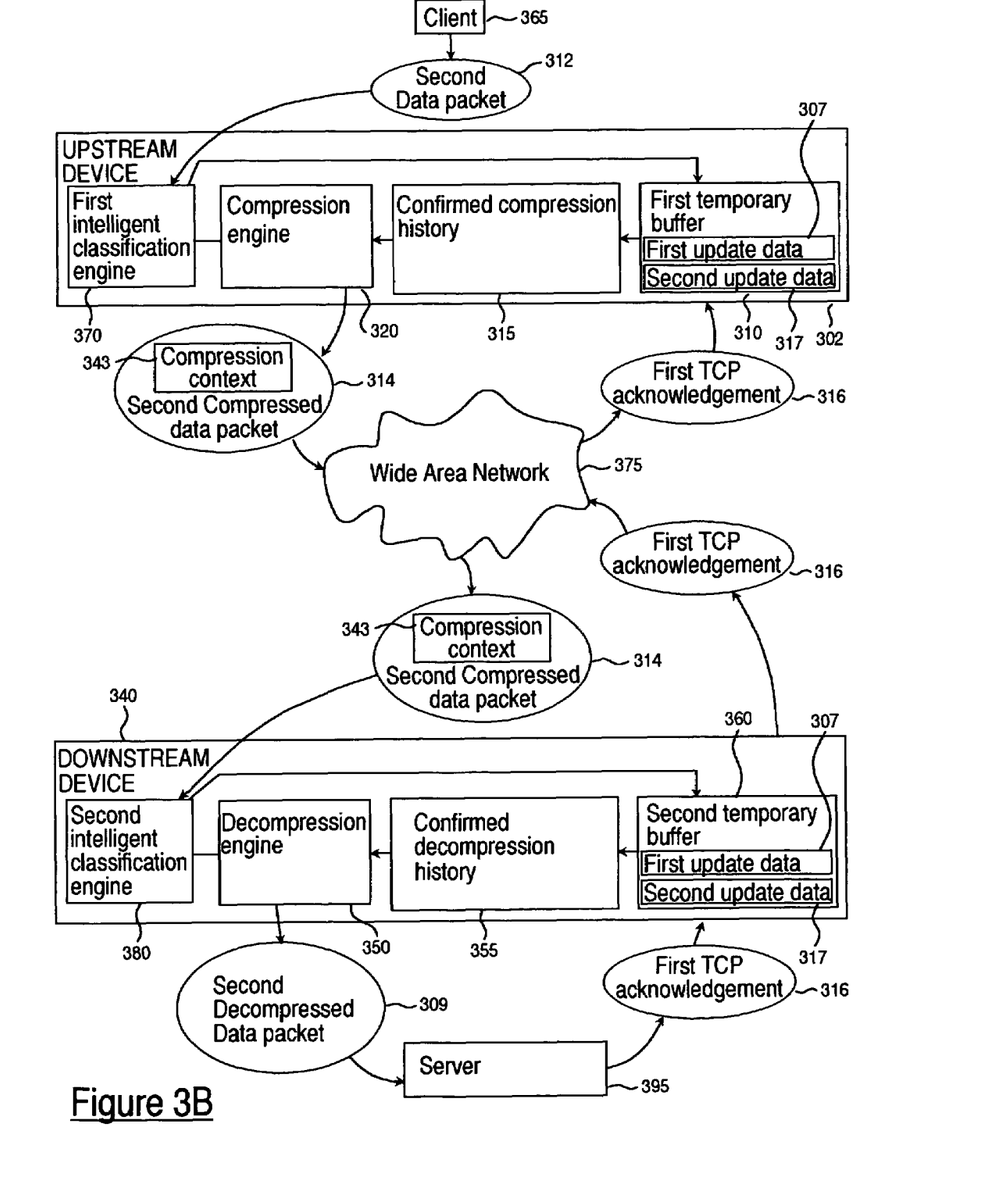

As shown in FIG. 3B, client 365 sends a second data packet 312 to upstream device 302 in which first intelligent classification engine 370 forwards the second data packet to compression engine 320 and related second update data 317 is forwarded to first temporary buffer 310. Compression engine 320 compresses second data packet 312 into second compressed data packet 314 and sends it to downstream device 340 via wide area network 375. In one exemplary implementation, second compressed data packet 314 includes compression context 343 which indicates confirmed compression history 315 was empty when compression operations associated with data in second compressed data packet 314 were performed.

Second compressed data packet 314 is received by second intelligent classification engine and forwarded to decompression engine 350. Decompression engine 350 examines compression context 343 to determine that confirmed compression history 315 was empty when second compressed data packet 314 was compressed. Decompression engine 350 decompresses second compressed data packet 314 and sends second decompressed data packet 309 to server 395. Related second update data 317 is stored in secondary temporary buffer 360. Server 395 receives second decompressed data packet 309. In the mean time, server 395 forwarded a first TCP acknowledgement 316 associated with receipt of first decompressed data packet 308 to upstream device 302 when first decompressed data packet 308 was received.

Figure 3C:
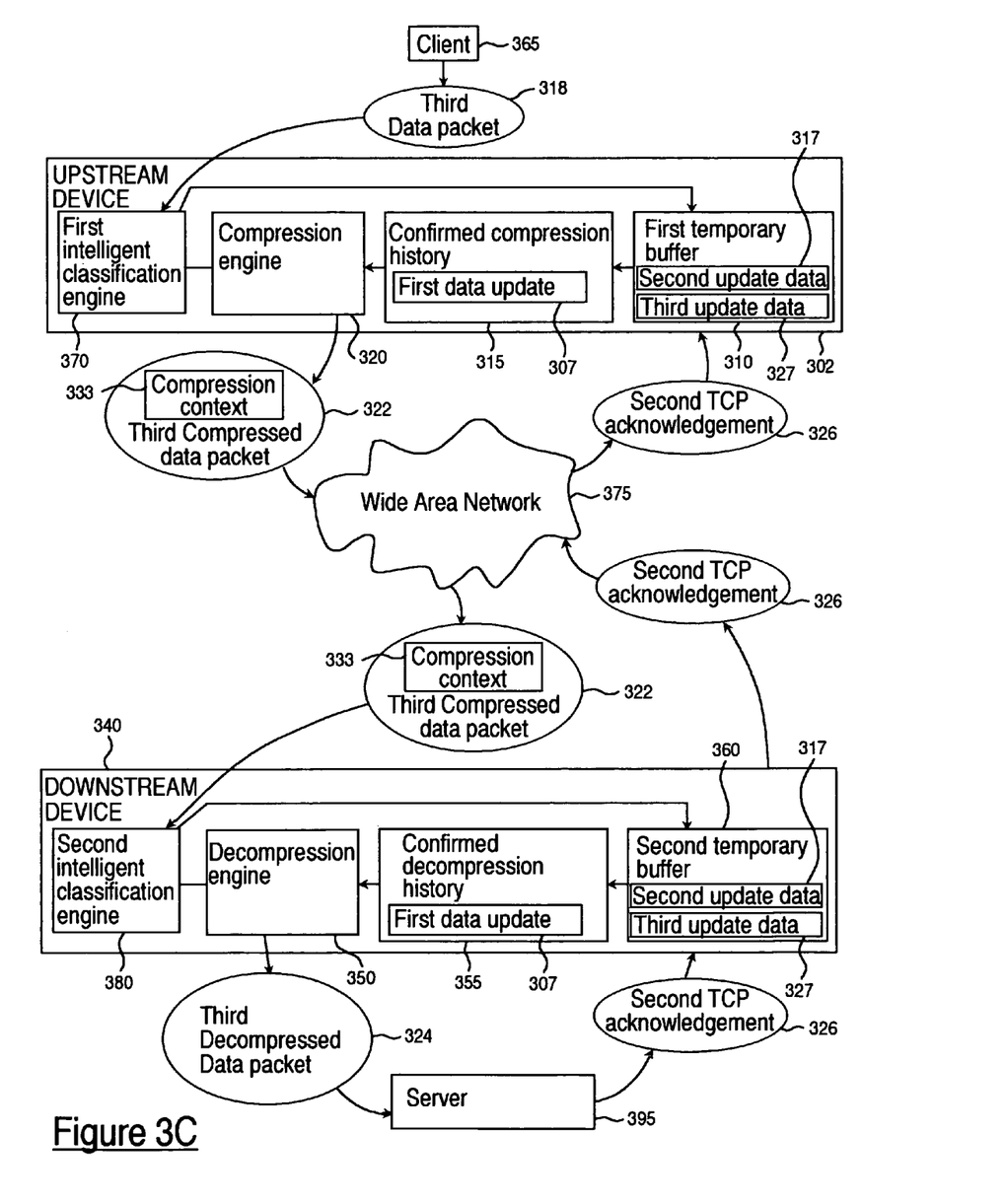

As shown in FIG. 3C, upstream device 302 receives first TCP acknowledgement 316 and incorporates first data packet 304 into confirmed compression history 315. Client 365 sends a third data packet 318 to upstream device 302 and first intelligent classification engine forwards the third data packet 318 to compression engine 320 and related third update data 327 to first temporary buffer 310. Compression engine 320 compresses third data packet 318 into third compressed data packet 322 using the updated confirmed compression history 315 that includes first update data 307 information from first data packet 304. In one exemplary implementation, third compressed data packet 322 includes compression context 333 which indicates confirmed compression history 315 included first update data 307 when data included in third compression data packet 322 was compressed.

The compressed data packet 322 is sent to downstream device 340 via wide area network 375. Third compressed data packet 322 is received by second intelligent classification engine 380 which forwards third compressed data packet 322 to decompression engine 350. Decompression engine 350 examines compression context 333 to determine what information was used to compress data packet 322. In one embodiment, the low overhead compression header of the third compressed data packet 322 contains compression context information. For example, in addition to a normal sequence number for third compressed data packet 322, the compression context information can also include the sequence number of first compressed data packet 306 within the low overhead compression header compression context 333 of compressed data packet 322, indicating to downstream device 340 that the third compressed data packet 322 was compressed using a confirmed compression history 315 that incorporated information from first data packet 304. Upon receipt of this indication, information from first compressed data packet 306 is incorporated into confirmed decompression history 355. Decompression engine decompresses third compressed data packet 322 with the updated confirmed decompression history that incorporated information from first compressed data packet 306 and sends third decompressed data packet 324 to server 395. Related third update data 327 is included in second temporary buffer 360. In the mean time, server 395 sent second TCP acknowledgement 326 associated with the receipt of second decompressed data packet 309 to upstream device 302 via wide area network 375.

Figure 3D:
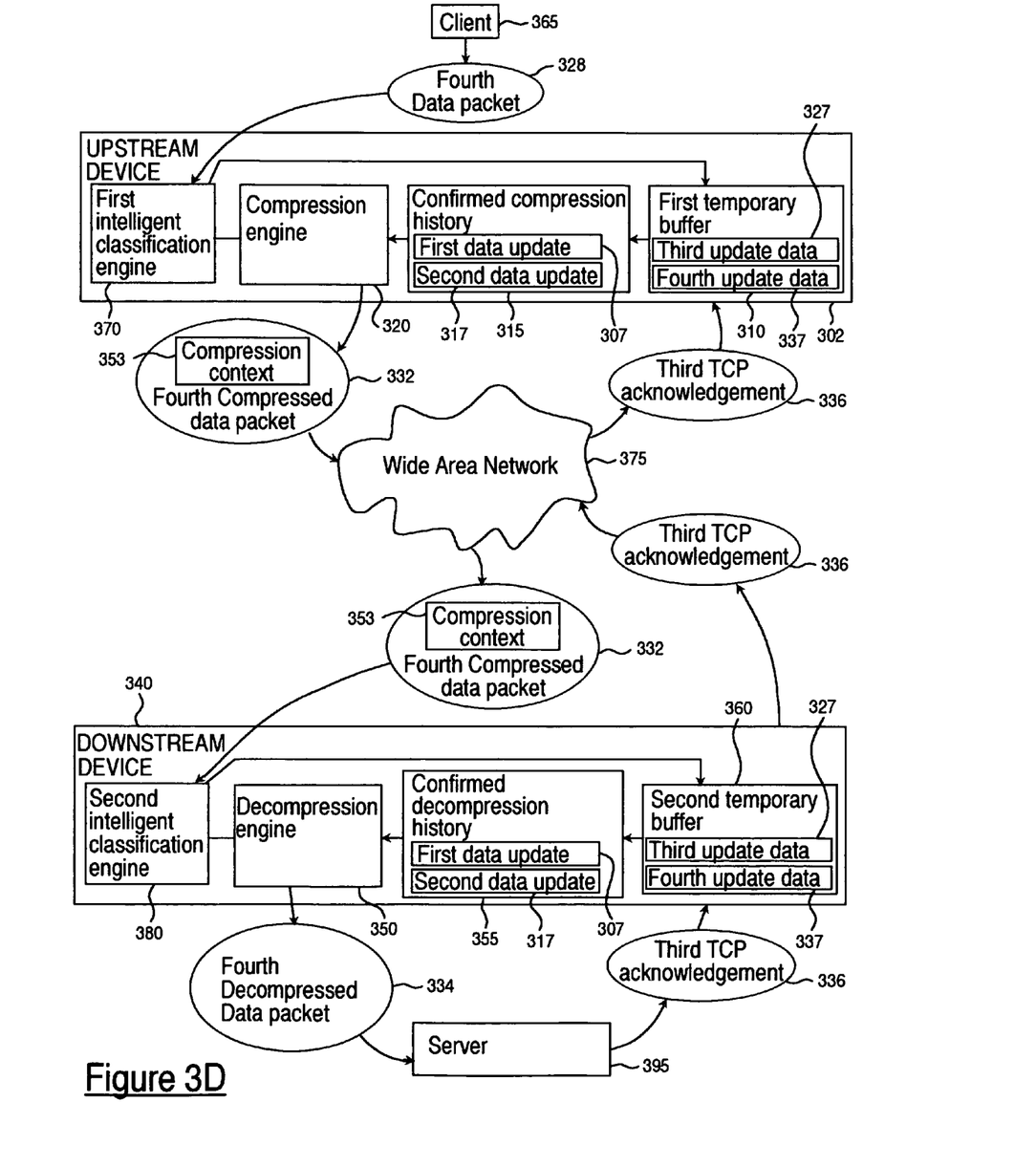

As shown in FIG. 3D, upstream device 302 receives second TCP acknowledgement 326 and incorporates second data packet 312 into confirmed compression history 315. Client 365 sends a fourth data packet 328 to compression engine 320 and first temporary buffer 310. Compression engine 320 compresses fourth data packet 328 into fourth compressed data packet 332 using the updated confirmed compression history 315 that includes first update information 307 and second update information 317 associated with first data packet 205 second data packet 312 respectively. Compression engine 320 sends fourth compressed data packet 332 to downstream device 340 via wide area network 375.

Fourth compressed data packet 332 is received by downstream device 340. In one embodiment, a low overhead compression header of the fourth compressed data packet 332 contains compression context information that indicates to downstream device 340 that the fourth compressed data packet 332 was compressed using a confirmed compression history 315 that incorporated first update data 307 and second update data 317. In one embodiment the context information is included in a compression context section of the low overhead compression header of fourth compression data packet 332. In one exemplary implementation, the context information is a sequence number of second compressed data packet 314 related to second update data 317. Upon receiving this indication, second data update data 317 is incorporated confirmed decompression history 355. Decompression engine 350 decompresses fourth compressed data packet 332 with the updated confirmed decompression history that incorporated first update data 307 and second update data 317 related to first compressed data packet 306 and second compressed data packet 314 respectively. Decompression engine 350 sends fourth decompressed data packet 334 to server 395. In the mean time, server 395 sends third TCP acknowledgement 336 associated with the receipt of third decompressed data packet 324 to upstream device 302 via wide area network 375.

Several exemplary embodiments have been described with compressed information flowing from a client to a server. It is appreciated that the present invention is also readily utilized with compressed information flowing from a server to a client. In one exemplary implementation, high end device 105 and access router 115 can each include an engine that performs compression and decompression and each can implement confirmed compression histories and confirmed decompression histories. High end device 105 and access router 115 can also include temporary buffers for temporarily storing corresponding information until ready for confirmed inclusion in the respective compression and/or decompression confirmed histories. For example, buffers in access router 115 can temporarily store data packet information until a corresponding TCP acknowledgement is received or temporarily store data packet information until a data packet includes compression context information indicating the update information is to be moved to a confirmed decompression history.

Figure 4:
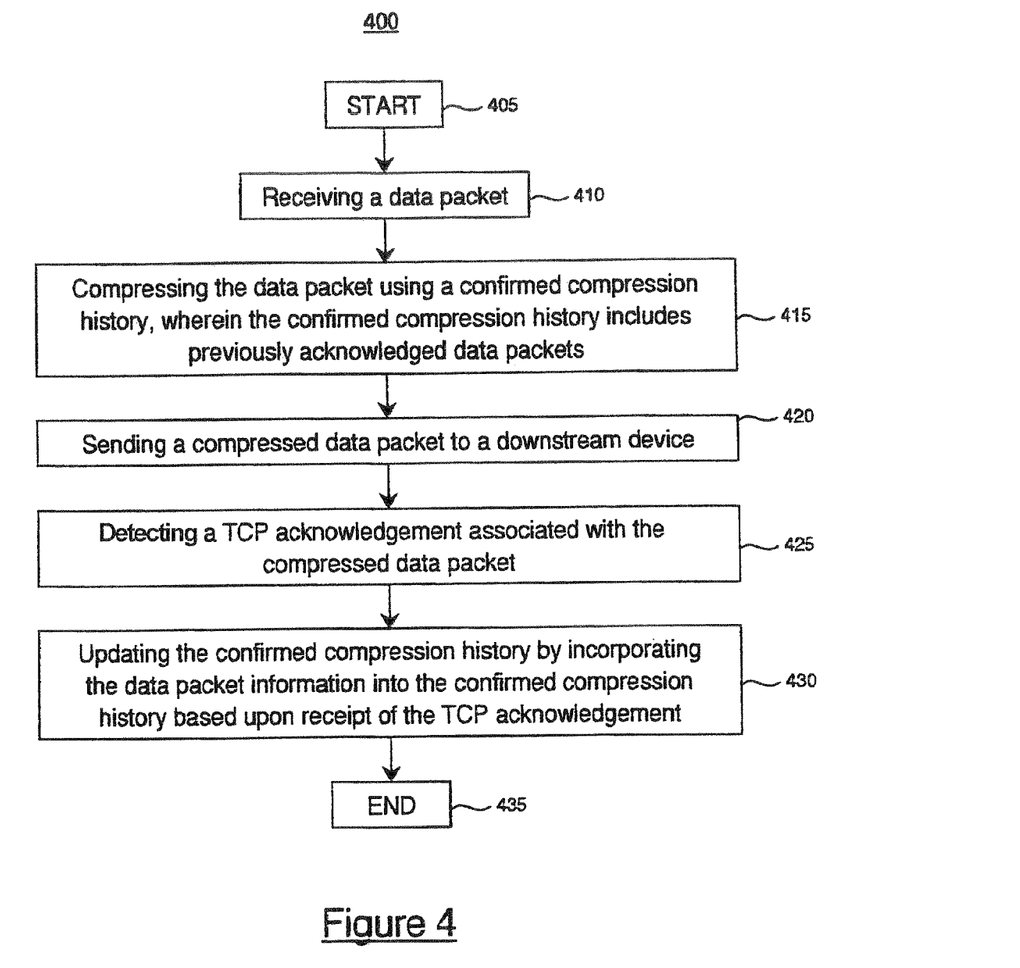
FIG. 4 illustrates an exemplary flowchart showing a data compression method in accordance with an embodiment of the present invention.

FIG. 4 illustrates a flowchart showing data compression method 400 in accordance with one embodiment of the present invention. Data compression method 400 facilitates effective and efficient data compression. In one embodiment, data compression method 400 ensures that information from compression histories utilized in compression operations is accurate and synchronized between compression and decompression components.

At block 410, a data packet is received. It is appreciated that the present invention is readily adaptable for implementation with a variety of data packets. For example, the present invention can be implemented using TCP data packets. The present invention utilizes features of TCP protocols (e.g., TCP acknowledgements) to facilitate data compression history maintenance. In addition, by utilizing intermediate network devices to snoop for TCP acknowledgements, the present invention allows compression history information synchronization to be performed in a transparent manner.

At block 415, the data packet is compressed using a confirmed compression history, wherein the confirmed compression history includes previously acknowledged packets. In one embodiment, a confirmed compression history only includes information associated with packets for which TCP acknowledgements have been received. Present invention confirmed compression histories are compatible with a variety of confirmed compression history formats.

At block 420, a compressed data packet is sent to a downstream device. In one embodiment the compressed data packet is forwarded downstream in a TCP compatible format and can be forwarded keeping the same TCP session header information. It is appreciated the compressed data packet can be readily implemented and forwarded in accordance with a variety of communication protocols. In one example, the compressed data packet can be sent though a wireless connection and/or a wired connection. Present invention compressed data packets are also compatible with a variety of other communication techniques, including but not necessarily limited to secured connections that utilize encryption.

At block 425, a TCP acknowledgment associated with the compressed data packet is detected. It is appreciated that the present invention is readily adaptable for implementation with a variety of detecting methods. For example, detecting can include transparently snooping TCP acknowledgements. Thus, the present invention can be implemented without dedicated compression acknowledgements from the downstream device.

At block 430, the confirmed compression history is updated by incorporating the data packet information into the confirmed compression history based upon receipt of the TCP acknowledgement. The confirmed compression history is not updated until the receipt of a corresponding TCP acknowledgement.

The data compression method 400 can utilize an intermediate network device to monitor and detect TCP acknowledgements. The intermediate network device (e.g., intermediate routers, etc.) snoop the TCP acknowledgements permitting transparent maintenance of compression histories which in turn facilitates realization of higher compression ratios across a network. The TCP acknowledgements can also be utilized in various other optimization activities, including acknowledgement spacing. The present invention can be implemented with or without a new header sequence numbers. Thus, the present invention can allow a low byte overhead compared to introducing a new header with sequence numbers. In embodiments with new header sequence numbers, the data compression method can use the TCP sequence numbers in said data packets to ensure synchronized data compression. The sequence numbers corresponding with the TCP packets can also be utilized to separate the TCP packets into an acknowledged range and an unacknowledged range, wherein the TCP packets that are in the acknowledged range are incorporated into the confirmed compression history. In one embodiment, Transmission Control Protocol (TCP) communications are uninterrupted by data compression.

In one embodiment of the present invention, data compression method 400 also accommodates bypass of compression operations in designated situations. For example, the bypass can be utilized to address various different contingencies. In one exemplary implementation, an intelligent classification engine determines if data is associated with particular types of data flow that are not compressed (e.g., audio, etc.) or if data is uncompressible and the intelligent classification engine bypasses compression operations. If this situation arises, the present invention can accommodate bypass of the compression operations by sending the raw data and not updating the compression and decompression histories for the corresponding packet since the raw data and not compressed data is sent.

Figure 5:
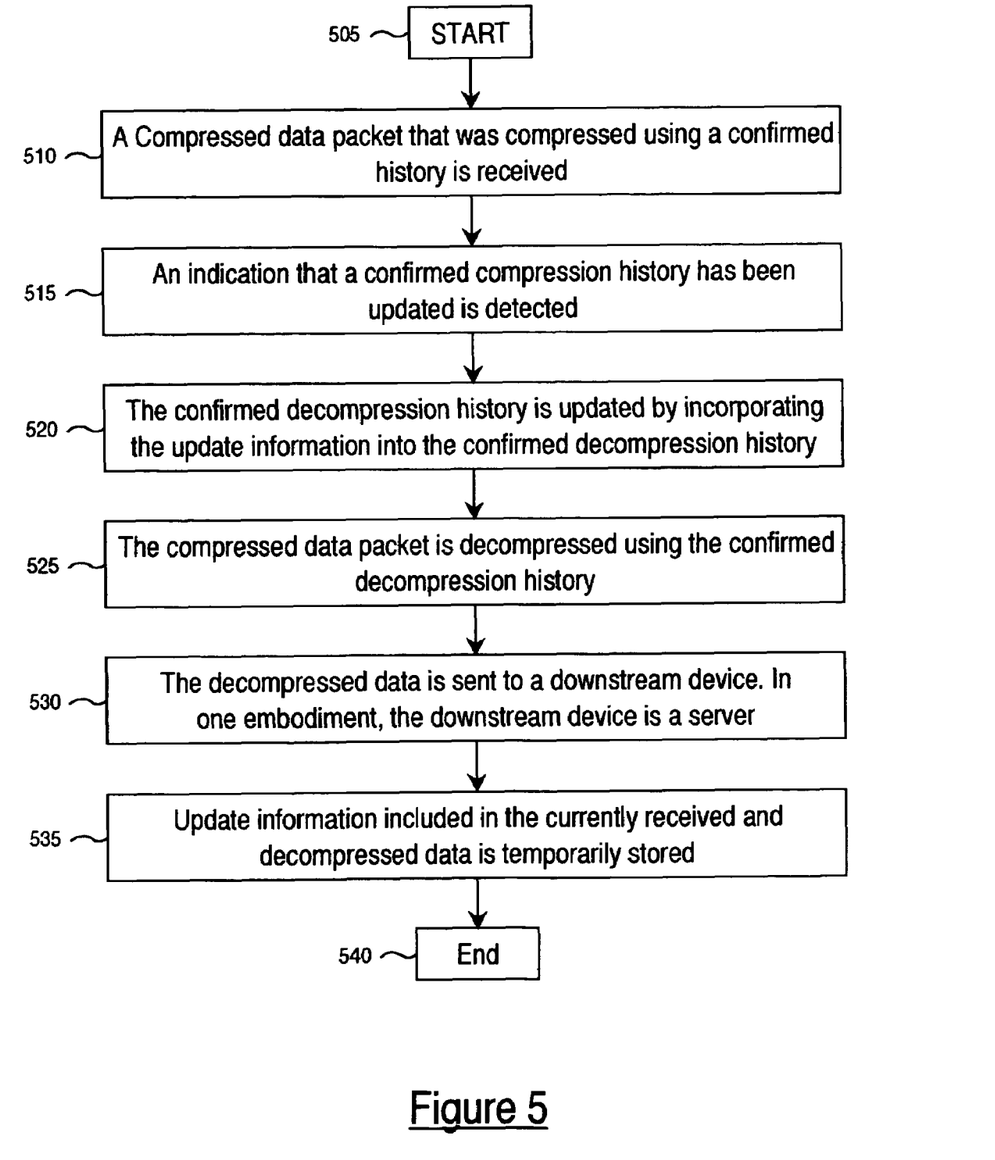
FIG. 5 illustrates an exemplary flowchart showing a data decompression method in accordance with one embodiment of the present invention.

FIG. 5 illustrates a flowchart showing data decompression method 500 in accordance with one embodiment of the present invention. Data decompression method 500 facilitates effective and efficient data decompression. In one embodiment, data decompression method 500 ensures that information from decompression histories utilized in future decompression operations is accurate and synchronized between compression and decompression components.

At block 510, a compressed data packet that was compressed using a confirmed history is received. It is appreciated that data decompression method 500 is compatible with variable data sizes. In addition, it is appreciated that the present invention is readily adaptable for implementation with a variety of compressed data packets. For example, the present invention can be implemented using compressed TCP data packets.

At block 515, an indication that a confirmed compression history has been updated is detected. It is appreciated that an indication can be implemented in a variety of ways. In one example, an indication can be provided by a compression context. For example, the compression context can include a sequence number of a previously received packet in the low overhead compression header of the currently received packet, wherein information from the previously received packet has been retrieved from a buffer on the compression side and incorporated into the compression history.

At block 520, the confirmed decompression history is updated by incorporating the update information into the confirmed decompression history. The decompression side also retrieves update information from a buffer on the compression side and incorporates the update information into the decompression history. The retrieved and incorporated update information is the update information entered into the buffer when the corresponding previously indicated packet was received. By waiting for the compression context indication synchronization between the confirmed compression history and the confirmed decompression history is maintained.

At block 525, the compressed data packet is decompressed using the confirmed decompression history. As indicated in step 530, the confirmed decompression history includes information that was included in a corresponding compression history when the received compressed data packet was compressed. Utilizing the same information in both the confirmed compression history and confirmed decompression history facilitates accurate and reliable compression/decompression operation results.

At block 530, the decompressed data is sent to a downstream device. In one embodiment, the downstream device is a server. In another embodiment, the downstream device is a client.

At block 535, update information included in the currently received and decompressed data is temporarily stored. In one exemplary implementation, the update information from the currently decompressed data is stored until a subsequently received packet includes compression context information indicating information from the current packet is included in the compression history. At that time, the update information will be incorporated in the decompression history in a manner similar to block 520.

The present invention is readily implemented with data flow differentiation. In one embodiment, compression/decompression is performed on a data flow basis. Differentiating compression/decompression operations on a data flow basis facilitates enhanced compressibility results. In one exemplary implementation, data flows entering a compression system are differentiated. For example, data flows associated with a hypet text transfer protocol (HTTP) session, a file transfer protocol (FTP) session, voice real time protocol streams, ordinary binary data, and/or other types of data flows are identified. Data flows that are readily compressible and compatible with achieving high compressibility are forwarded to compression engines for compression. Different corresponding compression/decompression compression histories are established and utilized for the different data flows. As a result the likelihood and locality of repeating strings within a flow is increased. Data flows that are not readily compressible and compatible with achieving high compressibility are not forwarded to and bypass compression engines.

In one embodiment, different compression contexts are created for different applications (e.g., TCP/UDP ports, etc.). Separating compression contexts permits highly compressible data flows (e.g., FTP) files, word documents, etc.) to be efficiently compressed without "pollution" by less compressible data flows (e.g., voice RTP streams, etc.), thereby avoiding adverse compression ratio impacts on the highly compressible data flows. Compression bypass is implemented for uncompressible or already compressed data. Mapping of applications to compression contexts can be statically agreed upon or dynamically setup between the compression/decompression endpoints.

Figure 6:
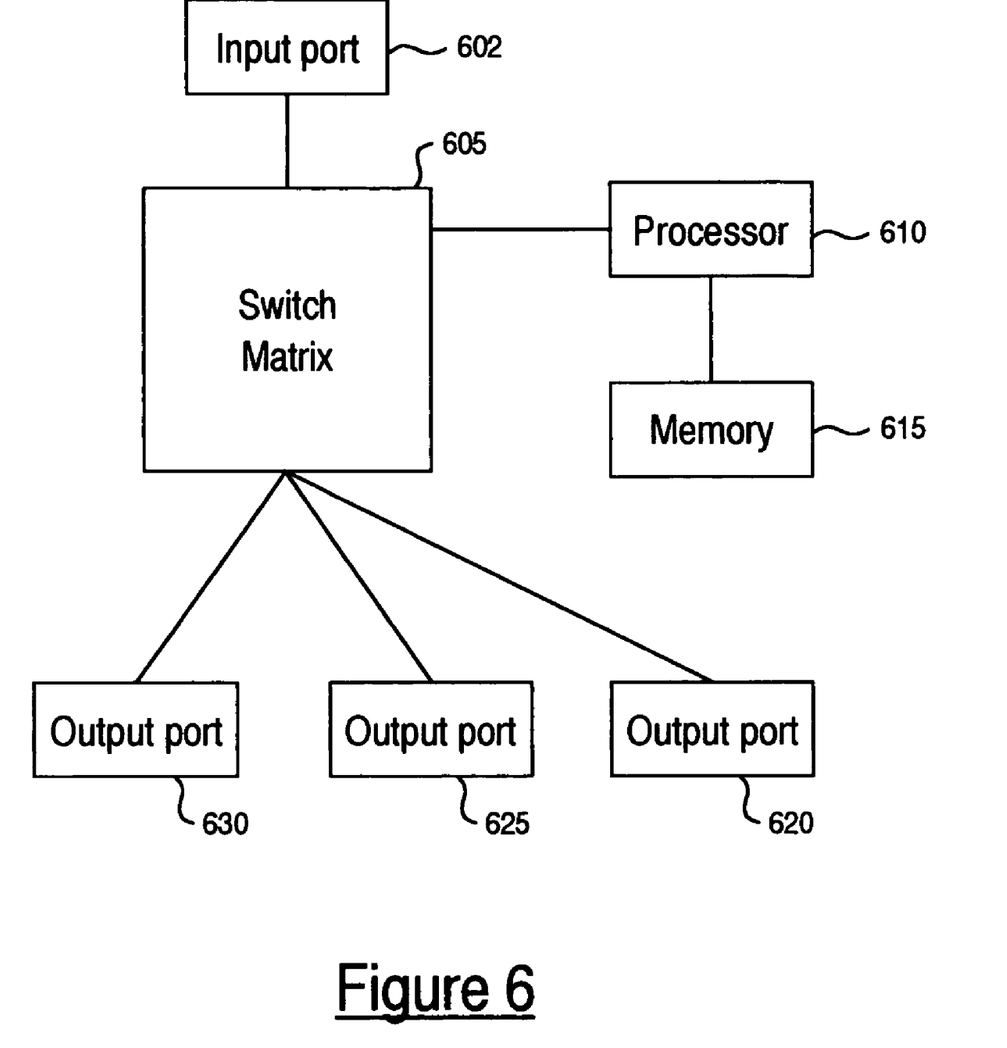
FIG. 6 is a block diagram that illustrates an exemplary switch system upon which an embodiment of the present invention can be implemented.

FIG. 6 is a block diagram that illustrates switch system 600 upon which embodiments of the present invention can be implemented. Switch system 600 includes an input port 602, a switch matrix 605, a processor 610, a memory 615, and output ports 620, 625, and 630. Input port 602 is coupled to switch matrix 605, which is coupled to output ports 620, 625, and 630. Switch matrix 605 is also coupled to processor 610 and memory 615. In one embodiment, switch system 600 is included in access router 115 shown in FIG. 1. A data packet originating from network 110 is forwarded to switch system 600 within access router 115.

The components of switch system 600 cooperatively operate to perform data compression/decompression and communication routing operations. For data compression, input port 602 receives a data and forwards the information for compression. The compressed data packet is fed into the switch matrix 605. The switch matrix 605 selectively sends the compressed data packet to output ports 620, 625 and 630. After the compressed data packet is sent to a downstream device via the output ports 620, 625, and 630, the confirmed compression history is tracked or temporarily stored awaiting acknowledgement of delivery. The TCP acknowledgements are transparently snooped and the compression history is updated by incorporating the data packet information into the confirmed compression history if a receipt of the TCP acknowledgement associated with the data packet has been received. Processor 610 controls the switching operations and performs data compression. Memory 615 stores information and instructions, including data compression algorithm executed by processor 610. The memory 615 can be used for storing temporary variables or other intermediate information during execution of instructions to be executed by processor 610. The output ports 620, 625, and 630 selectively send the compressed data packet to clients 120, 125, and 130.

For data decompression, input port 602 receives a compressed data packet and forward the information for decompression. The decompressed information is forwarded to the switch matrix 605. The confirmed decompression history is updated by incorporating the compressed data packet information into the confirmed decompression history in sync with the confirmed compression history if an indication that confirmed compression history is updated to include the compression data packet is detected. It is appreciated that an indication can be implemented in a variety of ways. In one example, an indication can be provided by a compression context, e.g., sequence number, in a low overhead compression header. Processor 610 controls the switching operations and performs data decompression. Memory 615 stores information and instructions, including data decompression algorithm executed by processor 610. The memory 615 can be used for storing temporary variables or other intermediate information during execution of instructions to be executed by processor 610. The output ports 620, 625, and 630 selectively send the compressed data packet to clients 120, 125, and 130.

In one embodiment, incoming data packet is compressed or decompressed by processor 610 before being delivered to a specific output port, in accordance with the present invention. It is appreciated that switch system 600 is compatible with sending the compressed data packet with a variety of communications techniques. For example, switch system 600 can use an Integrated Service Digital Network (ISDN) card or a modem to provide a data communication connection to a corresponding type of telephone line. As another example, switch system 600 can use a Local Area Network (LAN) card to provide a data communication connection to a compatible LAN. In yet another example, wireless links may also be implemented by switch system 600.

To summarize, the present invention facilitates reliable and efficient data compression by utilizing intermediate network devices to coordinate compression history updates based upon transparently snooped TCP acknowledgements and decompression history updates on compression context indications. Thus, the present invention reduces problems associated with undelivered packets on inter-data packet dependency. Moreover, the present invention allows a low byte overhead compared to introducing a new header with sequence numbers. Confirmed compression and decompression of the present invention is particularly useful in providing reliable communications over relatively limited bandwidth networks (e.g., a WAN, etc.). In addition to compression advantages such as reductions in the amount of data that is transferred over a medium of fixed bandwidth, enabling faster transmission rates, reducing the connection time, and facilitating increased communication of information, the present invention enables the advantages to be achieved transparently and reliably. For example, data compression/decompression of communication packets can facilitate reliable reduction of media bandwidth consumption for transferring a fixed amount of data with a fixed quality of service and also reducing "tariffs" on service associated with conventional compression dedicated acknowledgements. In addition, the present invention can be implemented without requiring TCP session terminations and three way connection management thereby avoiding significant performance overhead.

In the foregoing specification, embodiments of the invention have been described with reference to numerous specific details that can vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
    distinguishing received data packets associated with different flows based on application type;
    creating different compression histories for data packets associated with different applications;
    sending at least one data packet to a downstream device, wherein the data packet is compressed according to a confirmed compression history including one or more previously acknowledged data packets;
    receiving a delivery acknowledgement associated with the data packet sent to the downstream device; and
    updating the confirmed compression history by incorporating information corresponding to the sent data packet into the confirmed compression history based, at least in part, on receipt of the delivery acknowledgement.

2. The method of claim 1, wherein the at least one data packet is sent in accordance with a transmission control protocol (TCP), and wherein the receiving of the delivery acknowledgement comprises snooping TCP acknowledgements of intermediate devices.

3. The method of claim 1, further comprising using transmission control protocol (TCP) sequence numbers in the at least one data packet to ensure synchronized data compression.

4. The method of claim 1, further comprising:
    storing the at least one data packet in a temporary buffer; and
    removing the at least one data packet from the temporary buffer for incorporation into the confirmed compression history.

5. The method of claim 1, further comprising communicating a status of the confirmed compression history to the downstream device with a compression context, wherein the compression context indicates, to the downstream device, a state of the confirmed compression history utilized to compress the at least one data packet.

6. A device comprising:
    a controller to determine which packet flow is associated with a data packet based on application type, to compress the data packet in accordance with a confirmed compression history corresponding to the packet flow, to send the data packet to a downstream device, and to incorporate information corresponding to the data packet into the confirmed compression history for the packet flow responsive to a receipt of a delivery acknowledgement associated with the data packet sent to the downstream device.

7. The device of claim 6 further comprising a buffer for storing the information corresponding to the data packet while awaiting transmission control protocol (TCP) acknowledgement for the data packet.

8. The device of claim 7, wherein the information corresponding to the data packet is incorporated in the confirmed compression history from the buffer responsive to the receipt of the TCP acknowledgement.

9. The device of claim 7, wherein the controller directs notification to the downstream device of modifications to the confirmed compression history and to indicate, to the downstream device, a state of the confirmed compression history utilized to compress the at least one data packet.

10. The device of claim 7, wherein the controller is configured to ascertain that the packet flow associated with the received data packet does not have a compression history, and to create compression history for the packet flow.

11. A system comprising:
    means for distinguishing data packets associated with different flows based on application type;
    means for creating different compression histories for data packets associated with different applications;
    means for compressing one or more data packets in accordance with a confirmed compression history corresponding to at least one of the packet flows;
    means for sending the one or more data packets to a downstream device; and
    means for incorporating information associated with the one or more data packets into the confirmed compression history based upon receipt of one or more delivery acknowledgements associated with the one or more data packets sent to the downstream device.

12. The system of claim 11, wherein a communication protocol sequence number corresponding with at least one of the data packets sent to the downstream device is utilized to separate the data packet into an acknowledged range and an unacknowledged range, and wherein data packets that are in the acknowledged range are incorporated into the confirmed compression history.

13. The system of claim 11, further comprising means for routing data packets received from a server to a client over a network, and routing delivery acknowledgement packets from a client over the network to the server.

14. A system comprising:
    a compression component to distinguish data packets from different flows based on application types, and to compress data according to a confirmed compression history of previously received acknowledgement packets associated with data packets previously transmitted to a downstream device for a specific data flow; and
    a decompression component to receive compressed data over a network from an upstream device and to decompress the compressed data using according to a decompression history, wherein the decompression component is configured to send a delivery acknowledgement responsive to receiving the compressed data.

15. The system of claim 14, further comprising a storage component said to store information corresponding to the data while awaiting an acknowledgement from the downstream device.

16. The system network of claim 14, wherein the decompression component is configured to check for confirmed compression history updates from the upstream device, wherein the confirmed compression history updates indicate, to the decompression component, a status of a compression history utilized by the upstream device to compress the compressed data.

17. The system of claim 14, wherein the compression component further comprises an intelligent classification engine to distinguish data packets from different flows based on application types, and to create different compression histories for the data packets from different applications.

18. The system of claim 14, wherein the decompression component further comprises an intelligent classification engine to distinguish data packets from different flows based on application types, and to create different decompression histories for the data packets from different applications.

* * * * *

UNITED STATES PATENT AND TRADEMARK OFFICE
CERTIFICATE OF CORRECTION

PATENT NO. : 7,620,870 B2  Page 1 of 1
APPLICATION NO. : 11/287093
DATED : November 17, 2009
INVENTOR(S) : Srinivasan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Fourteenth Day of December, 2010

David J. Kappos
*Director of the United States Patent and Trademark Office*